3,766,164
SUBSTITUTED 4-(2-NITROISOBUTYLAMINO)-
AZOBENZENE
Reinhard Hahnle, Hofheim, Taunus, and Ernst Hoyer,
Frankfurt am Main, Germany, assignors to Farbwerke
Hoechst Aktiengesellschaft vormals Meister Lucius &
Bruning, Frankfurt am Main, Germany
No Drawing. Filed Nov. 16, 1970, Ser. No. 90,082
Claims priority, application Germany, Nov. 17, 1969,
P 19 57 681.9
Int. Cl. C09b 29/08, 29/26
U.S. Cl. 260—205    2 Claims

ABSTRACT OF THE DISCLOSURE

Water-insoluble monoazo dyestuffs of the formula

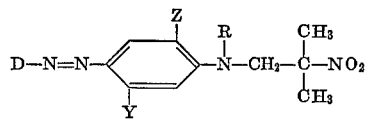

wherein D as the rest of a diazo component is nitro-phenylene, chlorophenylene, nitro-cyano-phenylene, nitro-chloro-phenylene, nitro-trifluoromethyl-phenylene, dinitro-trifluoro-methyl-phenylene, - dinitro-chloro-phenylene or nitro-dichloro-phenylene, Y is hydrogen, lower alkyl, lower alkoxy or acetylamino, Z is hydrogen, lower alkyl or lower alkoxy and R is hydrogen or lower alkyl. The dyestuffs are distinguished by a good color build-up and are suitable for dyeing and printing polyester and polyester-containing fibers fast to light, washing and thermofixation.

The present invention relates to new water-insoluble monoazo dyestuffs of the general Formula 1

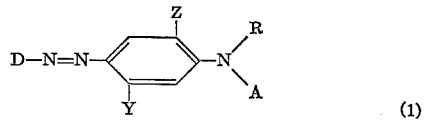

in which D represents the rest of a diazo component of the benzene series, which may be substituted by halogen atoms and/or alkyl, alkoxy, perfluoroalkyl, alkylsulfonyl, arylsulfonyl, carboalkoxy, carbon-amido, cyano or nitro groups, for example by chlorine or bromine atoms or by methyl, ethyl, methoxy, trifluoromethyl, methylsulfonyl, phenylsulfonyl or carbo-ethoxy groups, Y represents a hydrogen or halogen atoms, for example a chlorine or bromine atom, or a lower alkyl, alkoxy or acylamino group, Z represents a hydrogen or halogen atom, or a lower alkyl or alkoxy group, R represents a hydrogen atom or a lower alkyl group which may be substituted, for example, by hydroxy, alkoxy, acetoxy, carboalkoxy, acetyl or cyano groups or halogen atoms, such as chlorine or bromine atoms, and A represents the 2-nitro-isobutyl group of the Formula 2

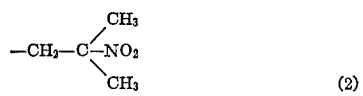

This invention, moreover, relates to a process for the preparation of these dyestuffs which comprises diazotizing an aromatic amine of the general Formula 3

$$D—NH_2 \quad (3)$$

in which D is defined as above, and coupling it with a coupling component of the general Formula 4

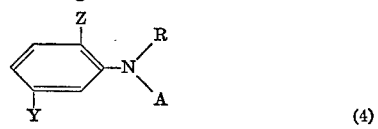

in which Y, Z, R and A are defined as above.

As diazo components of the cited general formula D—NH$_2$ used for the preparation of the novel dyestuffs there are mentioned aniline derivatives which are free from water-solubilizing groups, such as carboxylic acid or sulfonic acid groups, for example 2-chloro-4-nitroaniline, 4-carboethoxy-aniline, 2,4-dinitroaniline, 2-cyano-4-nitroaniline, 2,4-dinitro-6-chloroaniline, 2,4-dinitro-6-bromoaniline, 2,6-dichloro-4-nitroaniline or 4-methyl-aniline.

The coupling components of the cited general Formula 4 used according to the invention may, for example, be obtained in known manner my condensing an aniline of the Formula 5

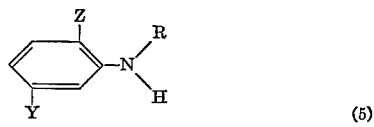

in which Y, Z and R are defined as above, with formaldehyde and nitropropane or with 2-nitro-2-methyl-propanol-(1).

Preferred among the new monoazo-dyestuffs of the invention are those of the formula

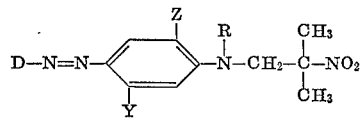

in which D represents nitrophenylene, chlorophenylene, nitro-cyano-phenylene, nitro-chloro-phenylene, nitro-trifluoromethyl - phenylene, dinitro - trifluoromethyl-phenylene dinitro-chloro-phenylene or nitro-dichloro-phenylene, Y represents hydrogen, lower alkyl, lower alkoxy or acetylamino, Z represents hydrogen, lower alkyl, or lower alkoxy, and R represents hydrogen or lower alkyl.

The coupling reaction is preferably carried out in an aqueous medium and it may be advantageous to eliminate the acid excess due to diazotization by adding an acid-binding agent, such as sodium hydroxide solution, potassium carbonate, sodium carbonate, sodium bicarbonate or sodium acetate.

The dyestuffs thus formed are insoluble in water and precipitate as crystals. They may, for example, be isolated by suction-filtration and then suitably be washed with water until free from electrolytes.

Using composititions which contain the novel dyestuffs in a finely divided form as well as a dispersing agent, intense and clear dyeings and prints having very good fastness properties to processing and use as well as to thermofixation and light are obtained with a good color build-up on synthetic fibres, such as polyamide fibres, especially polyester fibres, for example polyethylene-glycol terephthalate fibres, and cellulose acetate fibres, for example cellulose-2½-acetate and cellulose triacetate fibres. The very good fastness to wet processing, for example to washing at 60° C. or the fastness of the dyeings and prints to perspiration on cellulose acetate fibres in the presence of alkaline agents, is especially to be emphasized.

For dyeing polyester or cellulose acetate fibres the novel dyestuffs are advantageously applied in the form of granules or powder or as pourable liquid compositions. They are suitable for the dyeing from an aqueous bath at temperatures exceeding 100° C. under pressure or at about 100° C. in the presence of carriers under atmospheric pressure as well as for the Thermosol process, according to which polyester fibre woven or knitted fabrics are padded with suspensions of the novel dyestuffs, dried at temperatures below 100° C. and exposed for a short time to temperatures of from 180° to 220° C. The novel dyestuffs are also very suitable for dyeing fibre blends containing polyester fibres. When dyeing, for example, polyester-wool blends, the wool portion is only slightly dyed. The wool dyeing can easily be removed again by a reductive after-treatment or washing with emulsifiers.

For the production of prints on polyester or cellulose acetate fibre materials the novel dyestuffs are applied in the form of water-containing compositions which contain, in addition to the finely divided dyestuff, suitable thickenings, such as carbomethoxy cellulose or locust bean flour preparations or mixtures thereof and—in the case of polyester fibre materials—also fixation promoters. Fixation is carried out by steaming for 30 to 60 minutes at atmospheric pressure or for 10 to 30 minutes under elevated pressure of up to 2 atmospheres gage. Fixation may also be effected on polyester fibre materials by the action of hot air of from 180 to 200° C. for 30 to 90 seconds.

The following examples serve to illustrate the invention, the parts and percentages being by weight unless stated otherwise.

EXAMPLE I 13.8 parts of 4-nitroaniline, 30 parts by volume of 36% hydrochloric acid and 40 parts by volume of water were heated until the whole was entirely dissolved. 150 parts of crushed ice were added to this solution. Subsequently, 18 parts of a 40% sodium nitrite solution were added in one portion, while quickly stirring, to the mixture cooled to about −5° C. Stirring was continued for 20 minutes, the excess of nitrous acid was eliminated by means of amidosulfonic acid and the whole was suction-filtered.

A solution of 19.4 parts of N-β-nitro-isobutylaniline in 80 parts by volume of acetone was introduced while carefully stirring into the filtered solution. The pH of the mixture was adjusted to Congo neutral by means of about 30 parts of anhydrous sodium acetate and stirring was continued for 1 hour. The dyestuff of the formula

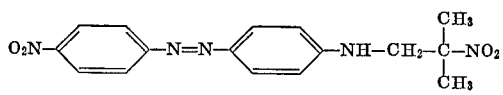

was suction-filtered, washed with water until free from electrolyes and dried. It was an orange colored powder which melted at 170° C.

The dyestuff yields on a fabric made from polyethyleneglycol terephthalate fibres orange dyeing which are distinguished by excellent fastness to light and thermofixation.

EXAMPLE 2

20.8 parts of N-β-nitro-isobutyl-3-methylaniline were dissolved in 80 parts by volume of acetone and the solution was poured onto a mixture which was stirred very quickly and consisted of 300 parts by volume of water, 200 parts of crushed ice and 20 parts by volume of 36% hydrochloric acid. Subsequently, a filtered aqueous solution of 4-nitrophenyldiazonium chloride prepared from 13.8 parts of 4-nitroaniline was added.

After stirring had been continued for 15 minutes, 50 parts of anhydrous sodium acetate were added. The crystallized dyestuff was suction-filtered and washed with water. The dyestuff of the formula

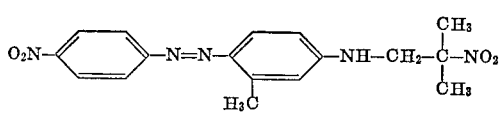

was obtained in a pure form by triturating it with 150 parts by volume of hot methanol, suction-filtering and drying it at 60° C. It was a brown powder which melted at 148° C.

The dyestuff yields on fabrics made from polyethylene glycol terephthalate fibres an intense orange dyeing having a very good fastness to light and thermofixation.

EXAMPLE 3

25.1 parts of 2 - amino - 3,5 - dinitro-benzotrifluoride were introduced into a mixture of 100 parts by volume of glacial acetic acid and 20 parts by volume of propionic acid and the mixture was diazotized at 10–15° C. with 31 parts of 41% nitrosylsulfuric acid. After stirring for 1 hour a slight excess of nitrous acid was still present.

19.4 parts of N-β-nitro-isobutyl-aniline were dissolved in 80 parts by volume of acetone and the solution was poured onto a mixture which was rapidly stirred and consisted of 300 parts by volume of water, 200 parts of crushed ice and 20 parts by volume of 36% hydrochloric acid. The mixture obtained was stirred rapidly and diazotized 2-amino-3,5-dinitro-benzotrifluoride was added. Stirring was continued for 15 minutes, the pH of the solution was adjusted to 5 by means of 8% aqueous sodium hydroxide solution and stirring was continued for another hour. The dyestuff formed was suction-filtered and triturated in a mortar with 150 parts by volume of hot methanol. The purified dyestuff of the formula

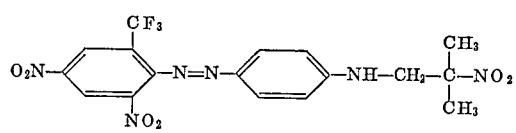

was suction-filtered and dried at 60° C. in vacuo. It is a dark olive powder which melted at 173–178° C. and dissolved in ethyl acetate to give a red color.

The dyestuff yields on polyester fabric intense red dyeings which are distinguished by a very good fastness to light and thermofixation.

EXAMPLE 4

21.8 parts of 2,4-dinitro-6-chloro-aniline were introduced at 15–20° C. into a mixture of 70 parts of concentrated sulfuric acid and 31 parts of 41% nitrosylsulfuric acid. Stirring was continued for 3 hours at room temperature.

28.1 parts of 2 - methoxy - 5 - acetylamino-N-β-nitro-isobutylaniline, M.P. 169° C., were dissolved in 150 parts by volume of acetone. This solution was added to a rapidly stirred mixture of 500 parts by volume of water, 700 parts of ice and 50 ml. of 36% hydrochloric acid.

The diazonium salt solution was added to the finely suspended coupling component, stirring was continued for 15 minutes and the pH of the solution was adjusted to 4 by means of 33% sodium hydroxide solution. After an hour, the dyestuff was suction-filtered, purified by digesting it with methanol, suction-filtered again and finally dried. The dyestuff of the formula

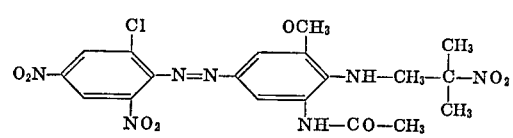

was a black powder which melted at 232–234° C.

The dyestuff yields on polyester fibres an intense blue dyeing having a very good fastness to light and sublimation, The following table contains further dyestuffs of the invention:

| Diazo component | Coupling component | Shade produced on polyester fibres |
|---|---|---|
| 2,4-dinitro-6-chloraniline | N-β-nitroisobutyl-aniline | Red. |
| 4-chloraniline | do | Yellow. |
| 2-cyano-4-nitroaniline | do | Red. |
| 3-chloro-4-nitroaniline | 2-methoxy-5-acetamino-N-β-nitroisobutylaniline. | Red. |
| 2-cyano-4-nitroaniline | do | Violet. |
| 2-chloro-3-nitroaniline | do | Red. |
| 2-trifluoromethyl-4-nitro-aniline. | N-methyl-N-β-nitroisobutyl-aniline. | Orange. |
| 4-nitroaniline | 3-methyl-N-ethyl-N-β-nitroisobutylaniline. | Red. |
| 2,6-dichloro-4-nitroaniline. | do | Brown. |
| 4-nitroaniline | 3-methoxy-N-β-nitroisobutylaniline. | Red. |
| 4-chloraniline | 2-methyl-N-β-nitroisobutylaniline. | Yellow. |

We claim:
1. A water-insoluble monoazo-dyestuff of the formula

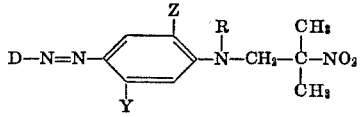

wherein D represents nitrophenylene, chlorophenylene, nitro-cyano-phenylene, nitro-chloro-phenylene, nitro-trifluoromethyl - phenylene, dinitro-trifluoromethyl-phenylene, dinitro-chloro-phenylene or nitro-dichloro-phenylene, Y represents hydrogen, lower alkyl, lower alkoxy or acetylamino, Z represents hydrogen, lower alkyl or lower alkoxy, and R represents hydrogen or lower alkyl.

2. The dyestuff of the formula

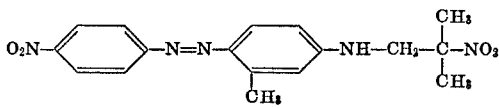

References Cited
UNITED STATES PATENTS
2,277,230    3/1942    Heinrich _____ 260—205

LEWIS GOTTS, Primary Examiner

C. F. WARREN, Assistant Examiner

U.S. Cl. X.R.

8—41 C, 50; 260—206, 207, 207.1, 562 A, 562 R, 574, 577